United States Patent [19]
Nowosielski

[11] Patent Number: 5,497,859
[45] Date of Patent: Mar. 12, 1996

[54] HYDRAULIC SLACK ADJUSTER

[76] Inventor: Johann A. Nowosielski, 4465 Fox Creek Dr., Marietta, Ga. 30062

[21] Appl. No.: 305,380

[22] Filed: Sep. 13, 1994

[30] Foreign Application Priority Data

Sep. 16, 1993 [ZA] South Africa ............... 93/6826

[51] Int. Cl.⁶ .................................................. F16D 65/38
[52] U.S. Cl. ........................ 188/79.62; 188/196 B
[58] Field of Search ................ 188/196 BA, 196 A, 188/196 B, 200, 79.51, 79.54, 79.53, 79.62

[56] References Cited

U.S. PATENT DOCUMENTS

| | | | |
|---|---|---|---|
| 1,668,730 | 5/1928 | Pearson | 188/79.62 |
| 2,138,206 | 11/1938 | Rasmussen et al. | 188/79.62 |
| 2,404,326 | 7/1946 | Taylor | 188/79.62 |
| 2,741,338 | 4/1956 | Taylor | 188/196 B |
| 4,056,175 | 11/1977 | Newstead et al. | 188/196 BA |

FOREIGN PATENT DOCUMENTS

| | | | |
|---|---|---|---|
| 2349734 | 4/1975 | Germany | 188/196 B |
| 2168770 | 6/1986 | United Kingdom . | |

*Primary Examiner*—Matthew C. Graham
*Attorney, Agent, or Firm*—Jones, Tullar & Cooper

[57] ABSTRACT

A hydraulic brake actuator which includes a cylinder, two pistons which are in the cylinder and which are movable apart by hydraulic pressure in the cylinder, a toothed rod which is engaged with one piston and which is movable to a limited extent axially relatively thereto, and a pawl which is secured to the other piston and which is engaged with the toothed rod, the rod and the pawl permitting the two pistons to move apart, but to move towards each other only to a limited extent.

4 Claims, 2 Drawing Sheets

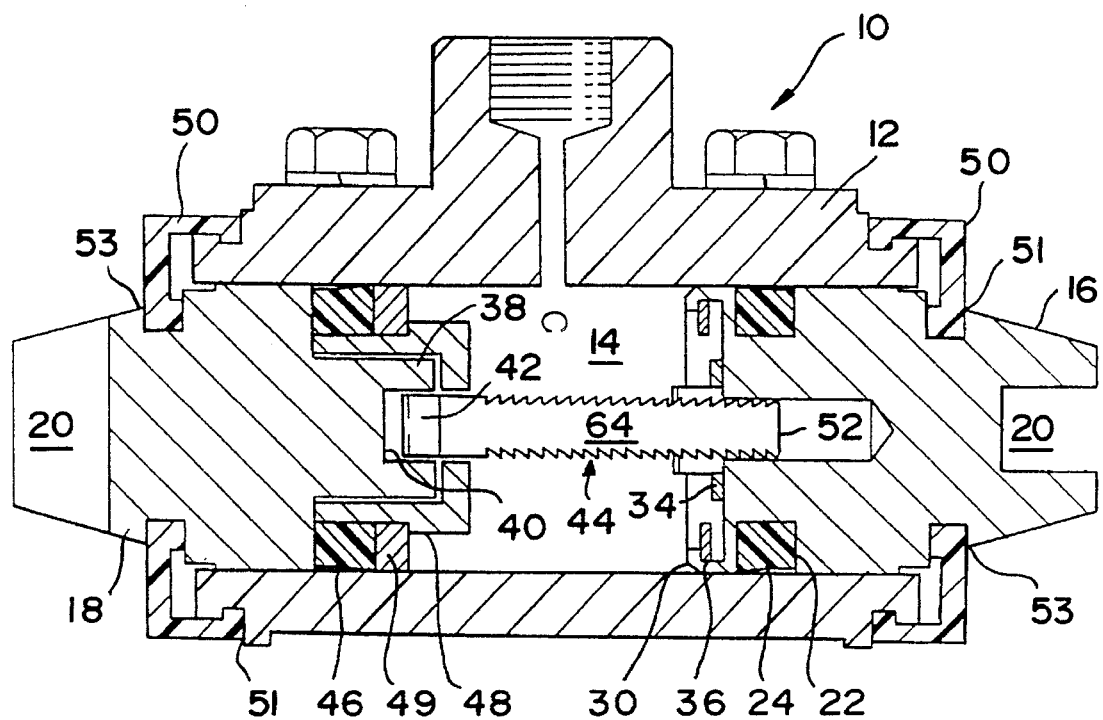
FIG. 2
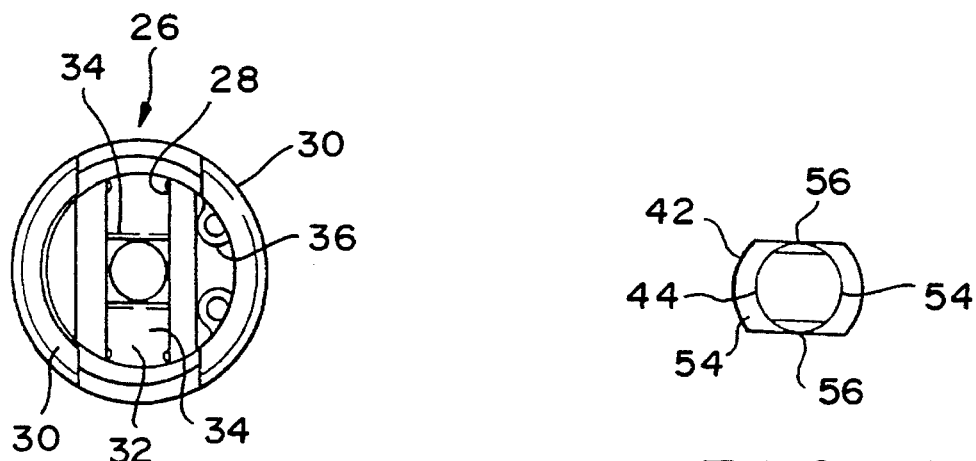
FIG. 3
FIG. 4

5,497,859

HYDRAULIC SLACK ADJUSTER

BACKGROUND OF THE INVENTION

This invention relates to hydraulic apparatus. The invention is described hereinafter with particular reference to a hydraulic cylinder and piston assembly which is suitable for use in the brake system of a motor vehicle, but the invention is not confined to this particular application.

Despite the widespread use of disc brakes, many vehicles still make use of drum brakes. There are a number of reasons for this which are not necessary for an understanding of the invention. Drum brakes function adequately but require adjustment at regular intervals as the brake shoes wear. Adjustment is particularly necessary when a hand brake which acts on the brake shoes is incorporated in the system. A hydraulic brake circuit which is actuated by pressure applied by the driver's foot can normally take up a fair degree of play to compensate for worn brake shoes but for effective hand brake operation the play caused by worn brake shoes must be compensated for.

A variety of techniques and devices, described for example in the specifications of South African patent No.75/4532, U.K. patent No.2168770 and U.S. Pat. No. 4,056,175 have been used to make it possible to compensate for worn brake shoes, sometimes automatically. Some of these devices are however complex, or require a substantial redesign of the existing brake actuating mechanism.

SUMMARY OF THE INVENTION

The invention provides hydraulic apparatus which includes a cylinder with a bore, at least one piston which is mounted in the bore and which is movable linearly outwardly relatively to the cylinder in a first direction under the action of a force exerted by pressurized hydraulic fluid in the bore, and a ratchet retaining device which, in an operative position, is engaged with the piston and which permits the movement of the piston in the first direction, and limited movement of the piston in a second direction which is opposite to the first direction when the pressure of the hydraulic fluid is reduced.

Preferably the hydraulic apparatus includes two pistons which are relatively movable away from each other under the action of the pressurized hydraulic fluid in the bore, and the ratchet retaining device, in the operative position, is engaged with both pistons and permits the pistons to move relatively away from each other, and relatively towards each other only to a limited extent.

The retaining device may be movable to an inoperative position in which it permits the piston to move to a greater extent in the second direction, or both pistons to move towards each other to a greater extent, depending on the configuration of the hydraulic apparatus.

The ratchet retaining device may include an elongate toothed rod which extends to the piston, or between thee pistons, as the case may be, and which is engaged therewith with a degree of play, and a pawl which permits relative movement of the rod relatively to the pawl in one direction but not in a reverse direction.

The retaining device may be moved to the aforementioned inoperative position by rotating the rod about its axis relatively to the pawl. In this way the pawl is disengaged from the teeth.

The rod is preferably engaged with at least one piston and is not rotatable relatively to that piston. Similarly, the pawl is not rotatable relatively to the structure to which it is fixed. The pawl may, for example, be fixed to the second piston.

In a preferred embodiment of the invention, the hydraulic apparatus includes a cylinder with a bore, two pistons which are mounted in the bore, and a ratchet device which extends between the two pistons, the ratchet device including a toothed bar which is non-rotatably engaged with one piston, and a pawl which is non-rotatably engaged with the other piston, the two pistons being movable relatively apart in the cylinder under the action of a force exerted by pressurized hydraulic fluid in the bore, the ratchet device permitting the pistons to move relatively towards one another only to a limited extent, and the toothed bar being rotatable relatively to the pawl thereby to disengage the pawl from the teeth and to permit the pistons to be moved relatively towards one another in the bore.

BRIEF DESCRIPTION OF THE DRAWINGS

The invention is further described by way of example with reference to the accompanying drawings in which;

FIG. 2 is a cross sectional view through the hydraulic apparatus of FIG. 1 with the various components assembled, FIG. 3 is an end view of an inner surface of one piston used in the hydraulic apparatus, and FIG. 4 is an end view of portion of a ratchet used in the hydraulic apparatus.

DESCRIPTION OF PREFERRED EMBODIMENT

Figure 1:
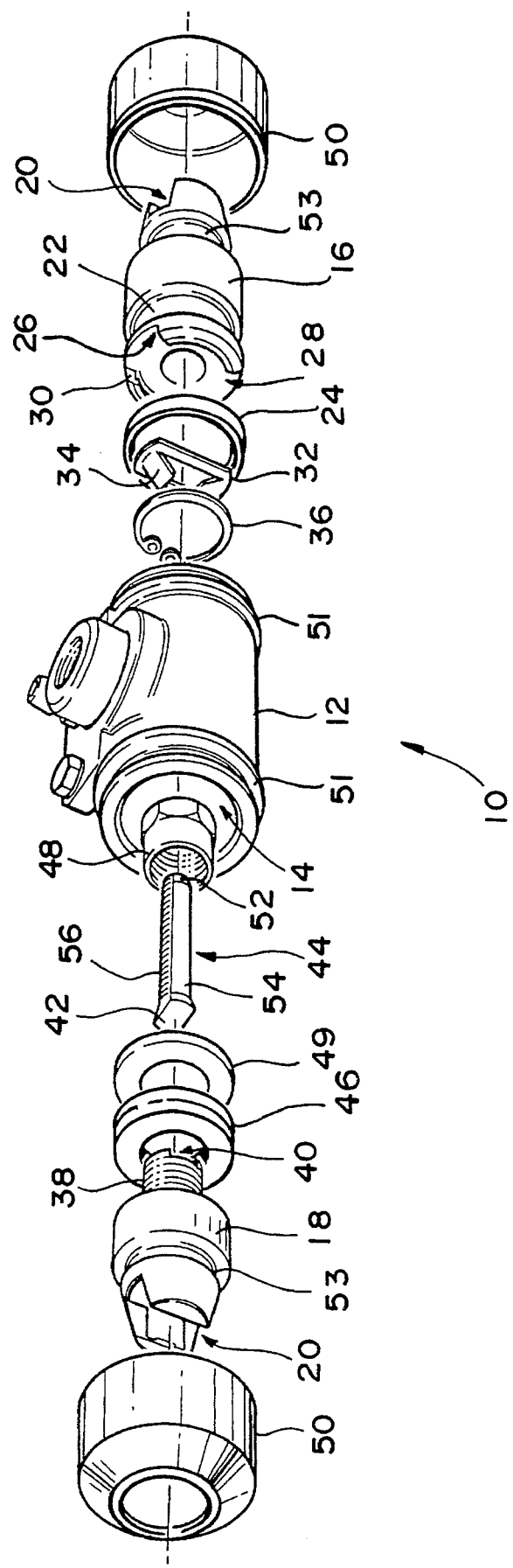
FIG. 1 is an exploded view of hydraulic apparatus according to the invention.

FIGS. 1 and 2 of the accompanying drawings illustrate hydraulic apparatus 10 according to the invention. In this case the apparatus is intended for use in the braking system of a vehicle to actuate a brake drum assembly, which is not shown. Apart from the hydraulic apparatus, the brake drum assembly is of a conventional construction and the hydraulic apparatus of the invention can in fact be used as a direct replacement for an existing hydraulic actuator.

The apparatus 10 includes a brake cylinder 12 of conventional construction with an inner bore 14. Two pistons 16 and 18 are slidably mounted in the bore. The pistons are formed with brake shoe retainer slots 20 in their respective outer ends.

The piston 16 has a groove 22 which receives a hydraulic seal 24. On an inner face, the piston 16 has a recess 26 with a shallow channel 28 which is bounded by two grooved side walls 30.

FIG. 3 shows the recess 26 and the grooved side walls 30. A spring steel clip 32 which has two circumferentially opposing catch formations 34 and which is of rectangular outline is engaged with the channel 28. A circlip 36 is engaged with the grooved side walls and ensures that the clip is secured in a non-rotatable manner to the piston.

The piston 18 has a threaded shank 38 with a slot 40 at its free end. The slot 40 receives a first, headed end 42 of an elongate toothed bar 44. The end 42, which is shown in FIG. 4, has parallel long sides which tit into the slot. It is apparent that the bar is not rotatable relatively to the slot.

A seal 46 fits over the shank 38 and a union nut 48 is threadedly engaged with the shank, bearing against a washer 49. The union nut keeps the seal in position and keeps the end 42 captive in the slot. The slot is bigger than the end and consequently although the bar cannot be detached from the shank, the bar can be moved axially relatively to the shank into and out of the slot to a limited extent.

Conventional dust covers 50 are provided to seal the outer ends of the pistons. These covers engage with grooves 51 in end formations of the cylinder 12, and in grooves 53 in the pistons.

The cylinder 12 is of a conventional construction and consequently can be used either as original equipment or as replacement equipment directly in substitution for an existing brake cylinder. In fact, an existing brake cylinder can be left in position and the remaining components of the hydraulic apparatus of the invention can be substituted for the pistons and other components of a conventional hydraulic actuator which are mounted to the cylinder.

When the hydraulic apparatus is assembled, the right hand end 52 of the second, bar 44 passes between the catches 34 of the clip 32 which acts in the manner of a pawl. The two pistons are rotated relatively to one another through 90° so that arcuate smooth outer surfaces 54 of the bar, defined between the toothed surfaces 56, can slide over the catches. The two pistons can then be moved inwardly towards each other. The pistons are thereafter rotated relatively to each other through 90° so that the catches 34 are brought into alignment with the respective toothed surfaces 56 on the bar. The brake shoes, not shown, are then engaged with the respective slots 20.

When the brake cylinder is internally pressurized by means of hydraulic fluid, and this takes place in a conventional way, the pistons are forced apart, with the catches 34 riding over the toothed surfaces 56. When the hydraulic pressure is released, a return spring (not shown), which is external to the cylinder and which is conventionally engaged with the brake shoes, acts to move the pistons towards one another. However this movement can take place only to a limited extent which is determined by the axial play between the first end 42 and the slot 40. It follows that the pistons which act on the brake shoes are thereby kept automatically in positions at which only a limited degree of movement is required for the brake shoes to be effectively actuated. Sufficient return movement is however permitted to ensure that the brake shoes do not bind on the brake drums. Additional play could be provided by allowing the spring steel clip 32 to move to a limited extent within the recess 26, in the axial direction of the rod 42.

Although the ratchet mechanism prevents the pistons from moving towards each other, except for a limited extent, it is possible to remove the pistons for servicing purposes simply by releasing one piston from its brake shoe, and then rotating the piston through 90° relatively to the other piston so that the pistons can be moved inwardly with the catches 34 sliding over the smooth surfaces 54 of the bar 44.

The hydraulic apparatus can also be used with a hand brake actuator. In this case, the actuator is mounted so that, directly or indirectly, the pistons are forced apart when the actuator is moved. The actuator returns in the reverse direction under the action of a suitable spring and the pistons then move inwardly towards each other to a limited extent. The movement is in fact analogous to what has been described hereinbefore with the mechanical movement of the actuator being equivalent to the movement which is achieved by the hydraulic pressure.

The hydraulic apparatus of the invention is of relatively simple construction and is inexpensive to manufacture. It holds the benefit however that it automatically adjusts to take account of worn brake shoes and thereby ensures that effective braking is achieved at all times even via the hand brake.

What is claimed is:

1. A hydraulic slack adjuster comprising:

a cylinder having a bore;

at least a first piston mounted in said bore and movable in said bore in a first direction linearly outwardly from a central portion of said cylinder under the action of a force exerted by pressurized hydraulic fluid in said bore, and rotatable in said bore, said piston having a face oriented in said bore toward said central portion of said bore and having a slot in said face;

an elongated bar having a headed end retained in said slot for limited movement in an axial direction of said bore with respect to said first piston while being rotatable with said first piston, said elongated bar having spaced toothed surfaces separated by spaced arcuate smooth surfaces;

a ratchet retaining device secured in said bore of said cylinder and engageable with said elongated bar, said ratchet retaining device including a spring clip having circumferentially opposed catch formations, said catch formations engaging said toothed surfaces of said elongated bar when said bar and said first piston are in a first, engaged position to permit only said limited movement between said headed end of said bar and said first piston, said circumferentially opposed catch formations allowing movement of said elongated bar and said first piston in said bore with respect to said ratchet retaining device when said first piston and said elongated bar are in a second, disengaged position; and means on said first piston exterior of said cylinder facilitating rotation of said first piston between said first and second positions.

2. The hydraulic slack adjuster of claim 1 further including a second piston mounted in said bore for linear and rotational movement, said second piston supporting said ratchet retaining device in said bore of said cylinder for rotation with said second piston.

3. The hydraulic slack adjuster of claim 2 wherein said second piston has a recessed face which includes spaced channels between grooved side walls of said second piston and further wherein said spring clip is positioned in said grooved side walls in said recessed face with said catch formation situated in said spaced channels.

4. The hydraulic slack adjuster of claim 3 further including a circlip positioned in said recessed face of said second piston and retaining said spring clip in said grooved side walls of said second piston.

\* \* \* \* \*